Figure 1:
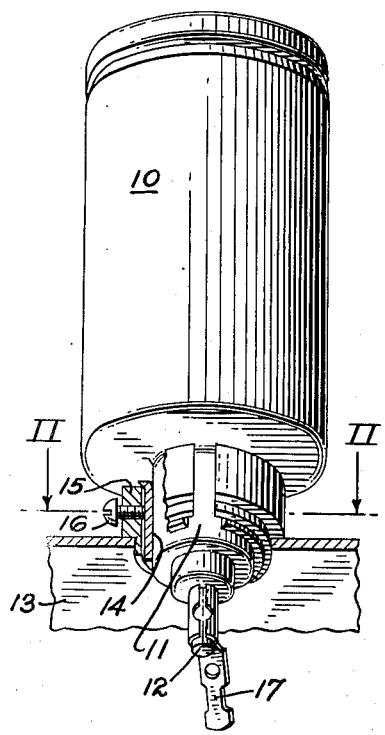

April 28, 1936. C. G. HENRIKSON 2,038,656
CAPACITOR MOUNTING
Filed Aug. 2, 1935

*Fig. 6.* *Fig. 9.* 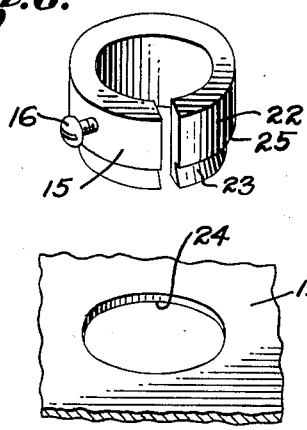 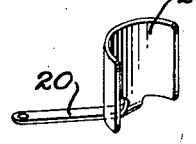
*Fig. 7.*
INVENTOR.
Carl G. Henrikson
BY
W. H. Atkinson
ATTORNEY.

Patented Apr. 28, 1936

2,038,656

UNITED STATES PATENT OFFICE 2,038,656

CAPACITOR MOUNTING

Carl G. Henrikson, Fort Wayne, Ind., assignor to The Magnavox Company, Fort Wayne, Ind., a corporation of Arizona Application August 2, 1935, Serial No. 34,376

17 Claims. (Cl. 175—315)

The present invention relates to an improved mounting means for electrical devices and more particularly to a new and novel mounting for securing electrolytic capacitors of the type having metallic containers upon the chassis of radio sets and like apparatus.

An object of the invention is to provide a simple and inexpensive mounting means for securing electrolytic capacitors and like apparatus to the chassis of radio sets, amplifiers and the like.

Another object of the invention is to provide a mounting for the container of an electrolytic capacitor which will eliminate the necessity for machine work such as the cutting of screw threads upon the capacitor container.

Another object of the invention is to provide a mounting for securing a capacitor container upon the chassis of a radio set which can be rendered secure from a position outside the chassis.

Another object of the invention is to provide a securing means for capacitors of the type having a projecting neck through which an electrode support extends that will permit a mounting of the capacitor upon a chassis with the electrode in a concealed position within the chassis.

Another object of the invention is to provide a mounting means for an electrolytic capacitor of the type having a metallic container with an extending neck at one end which projects through the wall of a chassis that may, by a simple interchange of parts, render the mounting means adaptable for mounting and securing both grounded and ungrounded capacitor units upon a chassis.

At the present time the major portion, if not all of the capacitors of the type contemplated by the present invention, have a screw threaded extending portion or neck which in conjunction with a nut cooperating therewith serves as a means to secure the capacitor upon the chassis. This form of mounting requires that the capacitor must be mounted upon the chassis before the electrical connections can be made thereto and is open to the further objection that the disposition of the nut inside the chassis makes it difficult to mount the capacitor upon the chassis and/or remove it for repair. It is therefore a further object of the present invention to provide a capacitor mounting means for use upon radio chassis and the like, which can be secured in place from a point external to the chassis and which will also permit the making of a permanent electrical connection thereto from points within the chassis before the capacitor has been mounted and secured thereupon.

Other objects and advantages of the invention will be in part pointed out and in part evident to those skilled in the art as the description thereof proceeds.

Figure 2:
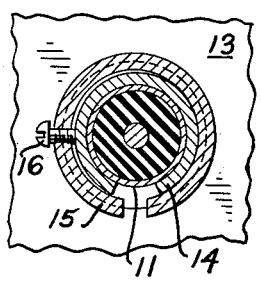
Figure 3:
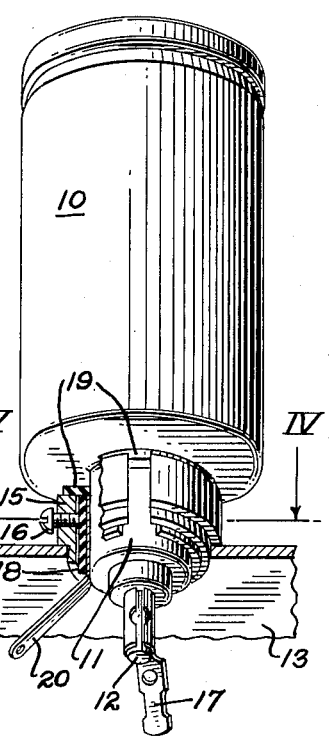
Figure 4:
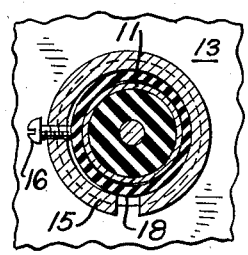
Figure 5:
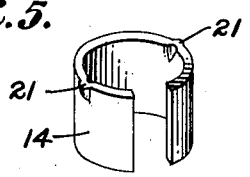
Figure 8:
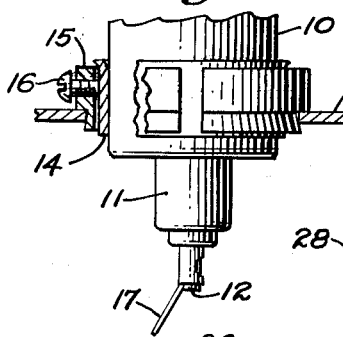
Figure 10:
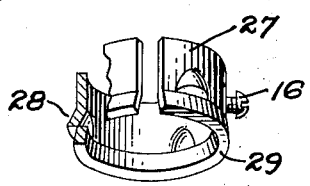

In the drawing wherein there is shown, by way of illustration and not of limitation, preferred embodiments of the invention;

Figure 1 is a perspective view of an electrolytic capacitor and mounting means with portions broken away to show the details of construction, Figure 2 is a sectional view taken along line II—II of Figure 1, looking in the direction of arrows, Figure 3 is a view similar to Figure 1, showing a capacitor unit and mounting wherein the capacitor is insulated from the chassis, Figure 4 is a sectional view taken along line IV—IV of Figure 3, Figure 5 is a perspective view of one of the parts of the capacitor mounting, Figure 6 is a perspective view of another of the parts of the capacitor mounting, Figure 7 is a fragmentary perspective view showing a portion of a radio chassis or platform adapted to receive a capacitor mounted in accordance with the invention, Figure 8 is a fragmentary view with portions broken away and showing the mounting means applied to the body portion of a capacitor unit, Figure 9 is a perspective view of a preferred form of terminal for use with the mounting when employed as illustrated in Figure 3 of the drawing, and Figure 10 is a perspective view of a modified form of the mounting member illustrated in Figure 6 of the drawing.

For the purpose of illustrating the invention there is shown in the drawing an electrolytic capacitor of the type having a metallic container 10 with an extending reduced portion or neck 11 through which an electrode support 12 projects. The extending reduced portion or neck 11 of the container 10 primarily serves as a means to center the electrode support 12 within the container, and because of its reduced diameter this portion has been found to also lend itself admirably to the application of securing means thereupon for mounting the capacitor upon the chassis of radio apparatus.

In the past, as previously suggested, capacitors of this type have been provided with a screw threaded portion about the extending neck 11 upon which a suitable nut could be threaded to secure the capacitor upon the chassis. As distinguished from the above form of mounting, the present invention contemplates a combined contractible and expansible assembly which will cooperate with the extending neck upon the container 10 in a novel way and secure the capacitor firmly upon the chassis.

In the drawing, designated by the numeral 13, there is shown a fragmentary portion of a chassis which forms what might be termed a supporting platform at the point where the capacitor is to be mounted. At the point upon the chassis 13 where the capacitor is to be mounted there is provided an opening or hole sufficiently large to receive the extending neck 11 of the capacitor container 10.

As shown in Figure 1 of the drawing, a preferred form of mounting means comprises a contractible collar-like member 14 that is adapted to engage the extending neck 11 and an expansible collar-like member 15 which carries screw threaded means 16. The screw-threaded means 16 is so disposed that the collar-like members 14 and 15 will be respectively contracted and expanded, as illustrated in Figure 2 of the drawing, when it is operated. It will be readily understood from an inspection of Figures 1 and 2 of the drawing that the form of mounting here shown is particularly adapted for use with capacitors of the type in which the container 10 forms one of the electrodes of the capacitor and is grounded upon the chassis 13. Under these conditions the collars 14 and 15, which are of current conducting material, will provide a connection between the extending neck 11 of the container 10 and the chassis 13. The connection to the insulated electrode within the capacitor will then be provided for by a terminal 17 upon the electrode support 12.

In Figure 3 of the drawing, there is illustrated a modified form of the capacitor mounting in which an insulating bushing 18 is substituted for the contractible collar 14, previously referred to and illustrated in Figure 1 of the drawing. The bushing 18 may be split at one side or it may be continuous, as illustrated in Figure 4 of the drawing. The bushing 18 may be formed of a short length of tubing, in which case there will be provided an insulating washer 19 at one end thereof for insulating the container 10 from the expansible collar 15, or it may be provided with an integrally formed flange about its upper end. When the container 10 is mounted upon the chassis with this form of mounting it will be seen that the reduced portion or neck 11 will be electrically insulated from the chassis 13, and therefore it will be necessary to provide means whereby an electrical connection may be made upon the container 10. This is accomplished in a novel way with the present invention by disposing a portion of a properly formed thin terminal 20 under the insulating collar 18 and in contact with the reduced portion or neck 11 of the capacitor unit.

For a detailed description of the several parts of the capacitor mounting illustrated in Figure 1 of the drawing, reference is now made to Figures 5, 6 and 7 of the drawing. As shown in Figure 5 of the drawing, the contractible collar 14 comprises a short cylindrical member having a portion cut away at one side to provide for the contractibility required. In order to hold the contractible member 14 in concentric relation with the expansible member 15 while the capacitor and mounting means is being placed upon a chassis, there is provided a plurality of outwardly extending portions 21 which are adapted to rest upon the top surface of the expansible collar 15. Instead of the outwardly extending portions 21 it is contemplated that the contractible collar 14 may be provided with a slight depression at a point thereon into which the end of the screw 16 may repose. Such an arrangement, as will be readily understood, would also accomplish the same purpose.

As shown in Figure 6 of the drawing, the expansible collar 15 has a main or body portion 22 and a reduced end portion 23, which latter portion is of a diameter, when unexpanded slightly less than the hole provided in the chassis 13 for the mounting of the capacitor. Such a hole or opening, designated by the numeral 24, is illustrated in Figure 7 of the drawing. The provision of the reduced end portion 23 upon the end of the expansible member 15 also forms a shoulder 25 at the base of the body portion 22. The reduced end portion 23 upon the expansible collar 15 is preferably provided with an outwardly flaring surface so that when it is projected through the opening 24 in the chassis 13 and the expansible member 15 is expanded by a tightening of the screw 16, it will produce a wedging action that will serve to draw the shoulder 25 upon the expansible collar 15 against the surface of the chassis 13 adjacent the opening 24. At this point it may be stated that the extending portion need not necessarily be flared. It may be of cylindrical configuration. It should also be stated that while only one screw 16 is shown upon the expansible collar 15, more screws may be provided if desired. It will also be understood that where the extending portion or neck 11 of the capacitor container 10 is of sufficient strength to withstand the direct application of a screw 16 thereto that the inner or contractible collar 14 may be dispensed with entirely.

While the capacitor mounting contemplated by the invention is illustrated in the drawing and described as disposed about a reduced and projecting portion or neck 11 upon the capacitor container 10, it will be readily understood by those skilled in the art that the type of mounting here disclosed can also be disposed about the larger or body portion of the capacitor by merely increasing its diameter and providing a larger hole 24 in the chassis 13 for the reception of the capacitor and the mounting means, as illustrated in Figure 8 of the drawing.

In Figure 9 of the drawing, there is shown a preferred form for the terminal 20, previously referred to in connection with Figure 3 of the drawing. As here shown, the terminal 20 has a semi-cylindrical contact making portion 26 which is adapted to provide a good electrical contact with the metal of the extending portion or neck 11 upon the capacitor container 10.

In Figure 10 of the drawing, there is shown a modified form of expansible collar, designated by the numeral 27. The type of collar may be formed from a short length of tubing or rolled from a flat strip of metal. In this embodiment, the expansible member 27 has equally spaced outwardly embossed or projected shoulder forming portions 28 and an outwardly flared end portion 29 therebelow. With an expansible collar 27 constructed as above described, it will be seen that when the screw 16 is tightened, the flared end portion 29 will expand within the opening 24 of the chassis 13 and produce a wedging action which will draw the shoulders 28 against the surface of the chassis 13 and thus firmly secure the capacitor upon the chassis.

While I have, for the sake of clearness and in order to disclose my invention so that the same can be readily understood, described and illustrated specific devices and arrangements, I desire to have it understood that this invention is not limited to the specific means disclosed, but may be embodied in other ways that will suggest themselves to persons skilled in the art. It is believed that this invention is new and it is desired to claim it so that all such changes as come within the scope of the appended claims are to be considered as part of this invention.

Having thus described my invention, what I claim and desire to secure by Letters Patent is—

1. In combination with a supporting platform having an opening therethrough, an electrolytic capacitor structure, comprising a container of conducting material having a wall provided with a depending neck, said neck extending through said platform opening, an electrode within said container, electrical connecting means for said electrode insulated from and passing snugly through said neck, and means exerting a clamping pressure upon the neck of said container where it extends through said platform and expansible to produce a continuous contact throughout substantially the entire periphery of the opening in said platform to secure the container on said platform.

2. In combination with a supporting platform having an opening therethrough, an electrolytic capacitor structure, comprising a container having a wall provided with a depending neck, said neck extending through said platform opening, an electrode within said container, electrical connecting means for said electrode insulated from and passing through said neck, clamping means exerting a clamping pressure upon the neck of said container in the plane of said platform and adapted to be expanded against the periphery of the opening in said platform, and means for expanding said clamping means to secure the container on said platform.

3. In combination with a supporting platform having an opening therethrough, an electrolytic capacitor structure, comprising a container having a wall provided with a projecting portion, said projecting portion being disposed in said platform opening, an electrode within said container, electrical connecting means for said electrode passing through said projecting portion, a contractible and a concentrically arranged expansible collar surrounding the projecting portion of said container and disposed in the opening in said platform, and means exerting respectively a contractible and an expansible force upon said collars to secure the container on said platform.

4. In combination with a supporting platform having an opening therethrough, an electrolytic capacitor structure, comprising a substantially cylindrical container of conducting material having a wall provided with a depending neck, said neck extending through said platform opening, an electrode within said container, electrical connecting means for said electrode and passing through said neck, an expansible means surrounding the neck of said container and disposed in the opening of said platform, and means producing a clamping pressure upon said neck in the plane of said platform and expanding said expansible means within the opening of said platform to secure the container on said platform.

5. In combination with a supporting platform having an opening therethrough, an electrolytic capacitor structure, comprising a container having a wall provided with a projecting neck, said neck extending through said platform opening, an electrode within said container having connecting means passing through said neck, a contractible collar surrounding the neck of said container, an expansible collar disposed in the opening of said platform and about said contractible collar, and means for contracting said first collar to produce a clamping pressure upon said projecting neck and expanding said expansible collar within the opening of said platform to secure the container on said platform.

6. In combination with a supporting platform having an opening therethrough, an electrolytic capacitor structure, comprising a substantially cylindrical container of conducting material having a wall provided with a depending neck, said neck extending downwardly through said platform opening, an electrode within said container, electrical connecting means for said electrode insulated from and passing snugly through said neck, a contractible means surrounding the neck of said container, an expansible means surrounding said contractible means and disposed in the opening in said platform, and means for contracting said first means and expanding said second means to secure the container on said platform.

7. In a mounting for securing an electrolytic capacitor or like device having an extending neck upon a supporting chassis having a neck receiving opening therein, the combination of expansible collar adapted to surround the extending neck upon said electrolytic capacitor or like device and expand annularly against substantially the entire periphery of the opening in the supporting chassis, and means carried by said expansible collar adapted to exert pressure upon the extending neck of said capacitor and expand said collar into firm engagement within the opening in said chassis.

8. A mounting means for securing an electrolytic capacitor of the type having a metallic container with a projecting neck at one end thereof upon a supporting chassis, said chassis having an opening in a wall thereof into which said projecting neck will extend, a contractible collar surrounding said projecting neck, an expansible collar arranged concentrically about said contractible collar and in the opening in said chassis, and screw threaded means carried by said expansible collar adapted when operated to contract said contractible collar upon the projecting neck of said capacitor and expand said expansible collar into securing engagement in the opening in said chassis.

9. The combination set forth in claim 8, characterized by the fact that the expansible collar has a shoulder thereupon which engages the outer surface of the chassis adjacent said opening.

10. The combination set forth in claim 8, characterized by the fact that the expansible collar has an outwardly flaring extension which projects into and engages the opening in said chassis.

11. The combination set forth in claim 8, characterized by the fact that the expansible collar has a shoulder thereupon and adjacent thereto an outwardly flaring conical extension which produces a wedging action that will draw said shoulder against the outer surface of the chassis when the screw threaded means is operated.

12. In an electrolytic capacitor mounting, the combination of a support having an opening therethrough, an electrolytic capacitor unit disposed with a portion projecting through the opening in said support, a combined contractible and expansible securing means disposed within said opening and surrounding said capacitor unit at the point where is passes through the opening in said support, and means for producing a contracting and expanding force upon said securing unit to secure said capacitor unit in the opening upon said support.

13. In an electrolytic capacitor mounting, the combination of a support having an opening therethrough, an electrolytic capacitor unit having a cylindrical container disposed with a portion thereof projecting through the opening in said support, a securing unit comprising a contractible ring and an expansible ring disposed within said opening and surrounding said cylindrical container at the point where it passes through the opening in said support, and means for producing a contracting and expanding force upon said rings to secure said capacitor unit in the opening upon said support.

14. In an electrolytic capacitor mounting, the combination of a supporting partition having an opening therethrough, an electrolytic capacitor unit disposed with a portion projecting through the opening in said supporting partition, a contractible ring and an expansible ring arranged in concentric relation to each other and disposed within said opening and about said capacitor unit at the point where it passes through said support, means carried by one of said rings for producing a contracting and expanding force upon the respective rings to secure said capacitor unit in the opening upon said support.

15. In an electrolytic capacitor mounting, the combination of a metallic support having an opening therethrough, an electrolytic capacitor unit disposed with a portion projecting through the opening in said support, a combined contractible and expansible securing means disposed within said opening and surrounding said capactor unit at the point where is passes through the opening in said support, one of said securing means being formed of insulating material, and means for producing a contracting and expanding force upon said securing unit to secure said capacitor unit in the opening upon said support.

16. In an electrolytic capacitor mounting, the combination of a metallic support having an opening therethrough, an electrolytic capacitor unit having a cylindrical container disposed with a portion thereof projecting through the opening in said support, a securing unit comprising a contractible insulating current conducting ring and an expansible ring disposed concentrically within said opening and surrounding said cylindrical container at the point where it passes through the opening in said support, and means for producing a contracting and expanding force upon said rings to secure said capacitor unit in the opening upon said support.

17. In an electrolytic capacitor mounting, the combination of a metallic supporting partition having an opening therethrough, an electrolytic capacitor unit disposed with a portion projecting through the opening in said supporting partition, a contractible non-metallic ring and an expansible metallic ring arranged in concentric relation to each other and disposed within said opening and about said capacitor unit at the point where it passes through said support, means carried by said metallic ring for producing a contracting and expanding force upon the respective rings to secure said capacitor unit in the opening upon said support.

CARL G. HENRIKSON.